(12) United States Patent
Van Gerwen

(10) Patent No.: US 9,533,784 B2
(45) Date of Patent: Jan. 3, 2017

(54) FOOD PRODUCTION LINE

(75) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 769 days.

(21) Appl. No.: 13/980,778

(22) PCT Filed: Jan. 19, 2012

(86) PCT No.: PCT/EP2012/000226
§ 371 (c)(1),
(2), (4) Date: Jul. 19, 2013

(87) PCT Pub. No.: WO2012/100925
PCT Pub. Date: Aug. 2, 2012

(65) Prior Publication Data
US 2013/0291483 A1   Nov. 7, 2013

(30) Foreign Application Priority Data

Jan. 25, 2011   (EP) ..................................... 11000571

(51) Int. Cl.
B65B 35/00 (2006.01)
B65B 1/36 (2006.01)
(Continued)

(52) U.S. Cl.
CPC ............. B65B 35/00 (2013.01); A22C 7/0069 (2013.01); B65B 1/366 (2013.01); B65B 25/06 (2013.01);
(Continued)

(58) Field of Classification Search
CPC .......... B65B 37/08; B65B 37/20; B65B 25/08;
B65B 3/30; B65B 3/305; B65B 1/36; B65B 1/363; B65B 1/366; B65B 35/00; B65B 35/08; A22C 7/0069
(Continued)

(56) References Cited

U.S. PATENT DOCUMENTS 2,657,423 A   11/1953   Elsaesser
2,775,083 A * 12/1956   Stirn et al. .............. B65B 1/366
                                                           53/250

(Continued)

FOREIGN PATENT DOCUMENTS

CN        2074996 U        4/1991
DE   102006020361 A1       8/2007
(Continued)

OTHER PUBLICATIONS

Japanese Office Action dated Oct. 7, 2015 for Application No. 2013-549757.

(Continued)

*Primary Examiner* — Stephen F Gerrity
(74) *Attorney, Agent, or Firm* — The Dobrusin Law Firm, P.C.

(57) ABSTRACT

The present invention relates to a food production line (11) with a forming apparatus (5) that comprises a rotating drum (1), which is utilized to form a product (7) from a food mass and a packaging machine (13), which packages the products in a packaging (14). The present invention further relates to a process for forming a product, whereas several products are formed and subsequently dropped simultaneously from a drum on an accumulation belt.

17 Claims, 6 Drawing Sheets

(51) Int. Cl.
   *B65B 37/08* (2006.01)
   *B65B 37/20* (2006.01)
   *B65B 25/06* (2006.01)
   *B65B 25/08* (2006.01)
   *A22C 7/00* (2006.01)

(52) U.S. Cl.
   CPC .............. *B65B 25/08* (2013.01); *B65B 37/08* (2013.01); *B65B 37/20* (2013.01)

(58) Field of Classification Search
   USPC .......................................... 53/113, 122, 157
   See application file for complete search history.

(56) References Cited

U.S. PATENT DOCUMENTS

| | | | |
|---|---|---|---|
| 3,122,869 A | 10/1961 | Miller et al. | |
| 3,137,029 A * | 6/1964 | De Zolt | B65B 25/08 100/907 |
| 3,177,524 A | 4/1965 | Gause | |
| 3,205,837 A | 9/1965 | Fay | |
| 3,213,486 A | 10/1965 | Blake | |
| 3,347,176 A | 10/1967 | Hall | |
| 3,481,283 A * | 12/1969 | Vogt | B65B 9/042 53/122 |
| 3,724,026 A | 4/1973 | Gernandt | |
| 3,750,232 A | 8/1973 | Holly | |
| 3,768,228 A * | 10/1973 | Doering, Jr. | B65B 9/042 53/122 |
| 3,823,633 A | 7/1974 | Ross | |
| 3,991,440 A | 11/1976 | Hendrickson | |
| 3,998,574 A | 12/1976 | Blake | |
| 4,182,003 A | 1/1980 | Lamartino et al. | |
| 4,418,446 A | 12/1983 | Sandberg | |
| 4,625,612 A | 12/1986 | Oliver | |
| 4,630,425 A | 12/1986 | Reed | |
| 4,630,426 A | 12/1986 | Gentry | |
| 4,630,725 A | 12/1986 | Steurmer | |
| 4,671,430 A * | 6/1987 | Dinius | B65B 1/366 222/135 |
| 4,709,837 A * | 12/1987 | Erdman | B65B 1/366 222/368 |
| 4,768,325 A | 9/1988 | Lindee et al. | |
| 4,936,203 A | 6/1990 | Aoki et al. | |
| 4,957,425 A * | 9/1990 | Fay | A22C 7/0069 264/335 |
| 4,987,643 A | 1/1991 | Powers | |
| 5,102,238 A | 4/1992 | Contzen | |
| 5,377,727 A * | 1/1995 | Ueda et al. | B65B 1/366 141/178 |
| 6,131,372 A | 10/2000 | Pruett | |
| 6,368,092 B1 | 4/2002 | Lindee | |
| 6,371,278 B1 | 4/2002 | Hart et al. | |
| 6,764,293 B2 | 7/2004 | Kashulines et al. | |
| 2005/0009696 A1 | 1/2005 | Mao et al. | |
| 2005/0013895 A1 | 1/2005 | Azzar | |
| 2005/0042321 A1 | 2/2005 | LaBruno | |
| 2005/0214399 A1 | 9/2005 | LaBruno et al. | |
| 2005/0220932 A1 | 10/2005 | Van Der Eerden | |
| 2008/0023098 A1* | 1/2008 | Friberg et al. | B65B 1/36 141/2 |
| 2008/0202226 A1 | 8/2008 | Heim et al. | |
| 2011/0151082 A1 | 6/2011 | VanGerwen | |
| 2013/0045294 A1 | 2/2013 | Van Gerwen et al. | |
| 2013/0164403 A1 | 6/2013 | Boogers et al. | |
| 2013/0224357 A1 | 8/2013 | Van Gerwen | |
| 2013/0273192 A1 | 10/2013 | Van Gerwen | |
| 2013/0291483 A1 | 11/2013 | Van Gerwen | |

FOREIGN PATENT DOCUMENTS

| | | | | |
|---|---|---|---|---|
| EP | 0818148 A1 | 1/1998 | | |
| EP | 1520480 B1 | 9/2007 | | |
| EP | 1920847 A1 | 5/2008 | | |
| EP | 2064956 A1 | 6/2009 | | |
| FR | 2387609 A | 11/1978 | | |
| GB | 965468 A | 7/1964 | | |
| GB | 1015820 A | 1/1966 | | |
| GB | 1211774 A | * | 11/1970 | ............. B65B 3/305 |
| GB | 2312641 A | 11/1997 | | |
| JP | H02-200138 | 8/1990 | | |
| JP | H02-291315 | 12/1990 | | |
| JP | H07-242211 | 9/1995 | | |
| JP | 2001299317 A | 10/2001 | | |
| JP | 2005-530514 | 10/2005 | | |
| WO | 88/07003 A1 | 9/1988 | | |
| WO | 96/09210 A1 | 3/1996 | | |
| WO | 2004/002229 | 1/2004 | | |
| WO | 2004/002229 A | 1/2004 | | |
| WO | 2005/009696 A1 | 2/2005 | | |
| WO | 2005/107481 | 11/2005 | | |
| WO | 2006/020139 A1 | 2/2006 | | |
| WO | 2008/091634 A2 | 7/2008 | | |
| WO | 2010/110655 A1 | 9/2010 | | |
| WO | 2012/012581 A1 | 1/2012 | | |
| WO | 2012/055454 A2 | 5/2012 | | |
| WO | 2012/059188 A1 | 5/2012 | | |
| WO | 2012/107236 A2 | 8/2012 | | |

OTHER PUBLICATIONS

Chinese Office Action for 201280006194.5, dated Nov. 3, 2014, Applicant CFS Bakel B.V.
Potentially related, U.S. Appl. No. 13/883,152 Published as 2013/0224357, Aug. 29, 2013.
Potentially related, U.S. Appl. No. 13/944,973 Published as 2013/0273192, Oct. 17, 2013.
Potentially related U.S. Appl. No. 13/982,377, Published as WO2012/107236. Aug. 16, 2012.
International Preliminary Report on Patentability Application No. PCT/EP2012/000226, mailed Apr. 23, 2013.
International Search Report and Written Opinion of the International Search Authority, Application No. PCT/EP2012/000226, mailed May 9, 2012.
European Search Report, Application No. EP 11005717, dated Dec. 27, 2011.
Potentially related, U.S. Appl. No. 13/883,152, filed May 2, 2013, Published as WO2012/059188A1.
Potentially related U.S. Appl. No. 13/001,672, filed Mar. 11, 2011, published as US2011/0151082.
Related Patent U.S. Appl. No. 13/641,249, filed on Oct. 15, 2012, published as US2013/0045294 publication date Feb. 21, 2013.
Related Patent U.S. Appl. No. 13/819,071, filed on Feb. 26, 2013, published as US2013/0164403, publication date Jun. 27, 2013.
The State Intellectual Property Office of China Office Action regarding Application No. 201280006194.5 dated Nov. 3, 2014.
European Patent Office Action regarding Application No. 12702177.2-1708 dated Mar. 16, 2015.

* cited by examiner

FOOD PRODUCTION LINE

The present invention relates to a food production line with a forming apparatus that comprises a rotating drum, which is utilized to form a product from a food mass and a packaging machine, which packages the products in a packaging. The present invention further relates to a process for forming a product, whereas several products are formed and subsequently dropped simultaneously from a drum on an accumulation belt.

Food masses, for example minced meat, is in many cases formed into a patty and subsequently packaged in a packaging. This process has to be carried out hygienically and/or cost efficiently. Furthermore, the line has to be flexible.

It was therefore the objective of the present invention to provide a food production line and a process that operates hygienically and/or cost efficiently and which is flexible.

The objective is attained by a food production line with a forming apparatus that comprises a rotating drum, which is utilized to form a product from a food mass and a packaging machine, which packages the product in a packaging, whereas the forming apparatus places the product directly into the packaging.

The present invention relates to a food production line. This food production line comprises a food forming apparatus with a rotating drum, which is utilized to form a product from the food mass.

The food mass can be any food mass known to the person skilled in the art.

This food mass is formed into two-dimensional or three-dimensional products, for example patties by means of a forming apparatus, which comprises a rotating drum. This rotating drum has on its surface, preferably around its entire circumference discrete cavities, which are open on one side and in which the food mass is formed into the food product. Preferably, the drum comprises a multitude of cavities, which are arranged in parallel; i.e. which are filled and emptied simultaneously. These cavities are arranged parallel to an axis of rotation of the drum. The drum rotates either continuously or intermittently and/or preferably not with a constant speed. During its rotation, the cavities are filled in one position and emptied in a subsequent position. Particularly, during emptying of the cavities, it is preferred that the speed of rotation of the drum is at least reduced. Preferably, the cavities are emptied in a stand-still position of the drum. During filling of the cavities, the cavities can be vented in order to release captured air. The emptying of the cavities is preferably supported by ejecting a gas, preferably air, through the cavities. The cavities are therefore, preferably, made at least partially from a porous, more preferably sintered material. Particularly, the bottom of the cavity is made, at least partially, from a porous material, while, more preferably, the sidewalls can be made from a porous material too.

Furthermore, the inventive product line comprises a packaging machine. This packaging machine packages the food product in a packaging, for example a tray or a box. The packaging item is preferably made from plastic, preferably a plastic film and/or paper or cardboard. The packaging machine is preferably a so-called "Form-Fill-Seal-packaging machine" (FFS-packaging machine). Such a packaging machine can be for example a so-called thermoformer, in which a multitude of packaging moulds are formed into a web, preferably a plastic film. These moulds are subsequently filled with the food product, here the formed food product, and is then sealed with a top-film. Finally, the moulds are cut out of the web. Alternatively, the packaging machine is preferably a so-called "Traysealer". In a "Traysealer", individual packaging moulds are provided which are filled with the packaging. These filled moulds are transported towards a sealing unit in which a top-film is sealed on the filled packaging moulds. During this sealing process, the packaging moulds are preferably cut out of the top-film.

According to the present invention, the forming apparatus now places the products directly into the packaging; i.e. the product drops from the drum of the forming apparatus directly into the packaging. Thus, the inventive food product line is very hygienic, because the filled packagings are not touched by a human before they are closed. Additionally, no additional belt between the drum of the forming apparatus and the packaging machine is needed, so that the inventive food production line is very cost efficient. Preferably, the rotating drum stands still or operates at a reduced speed while the products are discharged from the rotating drum into the packaging.

In a preferred embodiment, a multitude of products are placed into one packaging, whereas these products are at least partially stacked and/or shingled. Preferably, between the packaging and the food product and/or between two food products an interleaver is placed. This interleaver is for example made from paper or a plastic film. The paper can be coated with an anti-sticking material and/or with a material that makes the paper at least partially water or moisture resistant. The interleaver simplifies the removal of the product out of the packing item and/or the separation of the products.

In a preferred embodiment of the present invention, the part, for example a transportation belt, that carries the packaging and the drum are shiftable relative to each other in at least one direction. Preferably, the packaging machine can be moved vertically in order to achieve the same falling height even in case that the products are stacked in the packaging. Alternatively or additionally, the part and the drum are shiftable relative to each other in a horizontal plane. This preferred embodiment of the present invention allows the placement of products side by side in the packaging.

In order to achieve the relative movement between the drum and the part, the drum and/or the part can be moved. However, it is preferred that the part is moved. In case the part is a transportation belt, preferably an endless belt, the relative movement can achieved by moving the frame of the belt and/or by moving the belt itself. The movement of the part is preferably parallel to the axis of rotation of the drum so that a multitude of rows of products can be placed under the drum side by side.

Another preferred or inventive embodiment of the present invention is a food product line whereas it comprises an accumulation belt under the drum on which the products are directly stacked or shingled.

According to this preferred or inventive embodiment of the present invention, the food product line comprises an accumulation belt which is directly placed under the drum preferably upstream of a packaging machine and/or as part of a packaging machine. On this accumulation belt, the products are stacked and/or shingled.

Preferably, this accumulation belt and the drum are shiftable relative to each other, at least in one direction. Preferably, the accumulation belt is shiftable in two directions, a vertical- and a horizontal direction. In order to achieve the relative movement between the drum and the accumulation belt, the drum and/or the accumulation belt can be moved. However, it is preferred that the accumulation belt is moved. In case the accumulation belt, preferably an endless belt, is moved, the relative movement can be achieved by moving the frame of the belt and/or by moving the belt itself. The movement of the accumulation belt is preferably perpendicular to the axis of rotation of the drum so that a multitude of rows of products can be placed under the drum side by side.

Preferably, the accumulation belt is a so-called shuttle belt, which allows the to- and fro-movement of the front edge of the belt, whereas at least the back movement of the front edge is carried out at relatively high speed in order to avoid tilting of the product during discharge into the packaging. This preferred embodiment of the present invention is particularly advantageous for placing the stacked or shingled products into a packaging. The front edge is preferably driven by a servo motor.

The following disclosure applies to both inventive food product lines.

The motor means in order to utilize the movement of the part or the accumulation belt is preferably a servo-motor, so that the exact position of the accumulation belt is available for a control unit for example a PLC.

Preferably, the food product line comprises an interleaver storage and an interleaver carriage in order to provide an interleaver under and/or between two products. The interleaver carriage transports the interleaver from the storage to a position under the drum in which the products are discharged from the drum. During this transport, the interleavers are preferably held at the interleaver carriage by means of vacuum. Preferably, the carriage is driven by servo-motor to allow a very exact positioning of the interleaver under the drum. While dropping, the product falls on the interleaver and then takes the interleaver along until they hit the packaging, the accumulation belt and/or the stack.

Another subject matter of the present invention is a process for forming a product from a food mass and packaging the product, whereas several products are formed and subsequently dropped simultaneously from a drum on an accumulation belt, whereas these products are placed at least partially sequentially into a multitude of trays.

The disclosure made regarding the inventive production lines also applies to the inventive process and vice versa.

According to the inventive process, a multitude of products are formed and dropped simultaneously from a drum on an accumulation belt. Subsequently, these products are placed sequentially into a multitude of trays. This embodiment of the present invention has the advantage that the number of cavities operated in parallel need not be identical with the number of products, stacks or shingled portions, which are located side by side in one packaging.

Preferably, the products are stacked and/or shingled before they are placed into the packaging. In a preferred embodiment of the present invention, in one packaging, food products from two forming sequences are filled. Thus, even though the products are formed sequentially, they are nevertheless filled into one packaging. This preferred embodiment of the inventive process allows even more flexibility regarding the number of products formed simultaneously and the number of products put into one packaging.

According to another preferred or inventive embodiment of the present invention, the products are placed simultaneously into a multitude of packagings.

The disclosure made regarding the inventive production lines and the inventive process also applies to this inventive process and vice versa.

Preferably, two or more products are stacked or shingled on the accumulation belt.

In a preferred embodiment, an interleaver under and/or between two products.

The inventions are now explained in further detail according to FIGS. 1-9. These explanations do not limit the scope of protection. The explanations apply to all inventions, respectively.

Figure 1:
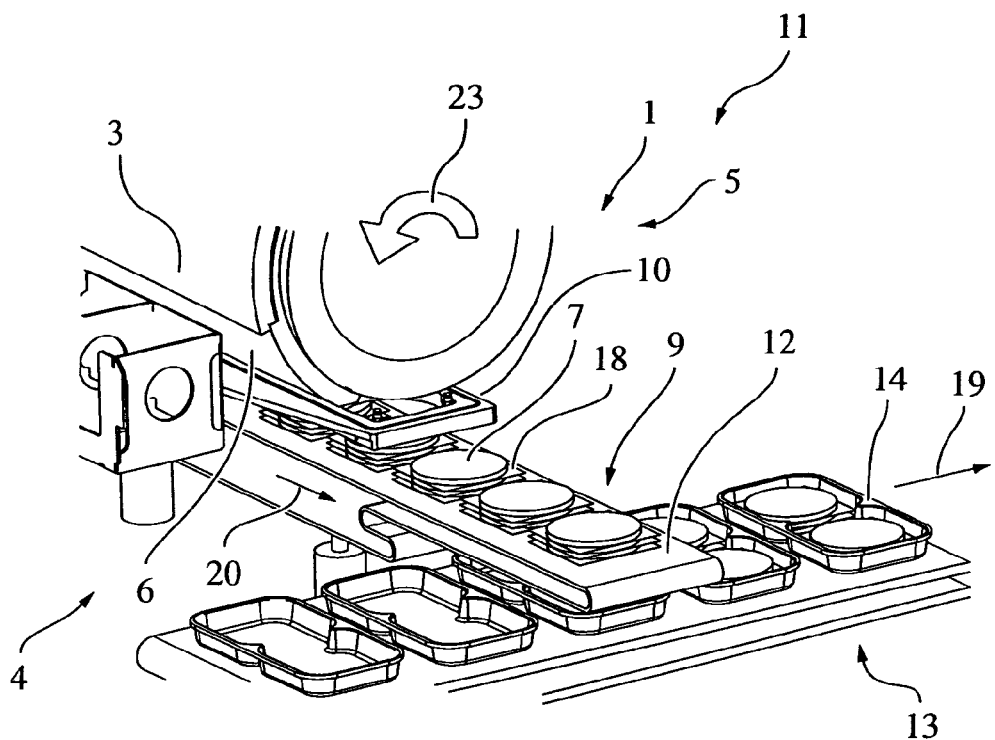
FIGS. 1-3b show a first embodiment of the present invention.

FIGS. 1-3b show a first embodiment of the present invention. In these figures, a food production line is depicted, which comprises a rotating drum 1, which rotates in the present case counter clockwise as indicated by arrow 23. As can be particularly seen from FIG. 2a, this drum comprises around its circumference a multitude of cavities 17 in which a food product, particularly a meat product, can be formed, here in cylindrical flat patties. The axial extension of the drum is designed such that a multitude, here five, cavities are arranged in parallel in a row and thus filled and emptied simultaneously. Preferably, the cavities or the drum are at least partially made from a porous, preferably a sintered material in order to, for example, facilitate venting of the cavities during filling and/or ejection of air for emptying the cavities. Around a segment of the rotating drum 1, a shoe 3 is arranged, which has an inlet for the food mass and which distributes the food mass in cavities, while the respective row of cavities rotate past the shoe. Preferably, this shoe 3 has an elongated outlet 6 to avoid that the products fall at least partially out of the cavities, before they reach the discharge position. Alternatively or additionally, a vacuum can be applied through the porous structure of the cavity to hold the patty in the cavity. In the discharge position, which is in the present case the 6 o'clock-position, the products 7 are discharged on an accumulation belt 9, where they are stacked or shingled. To avoid that the products stick together, preferably an interleaver 18 is placed between two products. This is utilized by an interleaver carriage 10, which delivers one interleaver paper per cavity from an interleaver storage 4 to the 6 O'clockposition. During this movement, the interleaver papers are preferably temporarily fixed to the interleaver carriage by means of vacuum. When the products are discharged in the discharge position, they take the interleaver along in their downward movement. After the products have been discharged on the accumulation belt and stacked or shingled, they are transported by the accumulation belt 9 into a discharge position, as indicated by arrow 20. In this discharge position, the stacked products, here two stacks are placed into one packaging 14, which are transported by another transportation belt. This belt preferably comprises means to space the packagings 14 at a certain distance in one or two directions. This simplifies the exact insertion of the products into the packaging. Belt 13 can be part of a packaging machine, for example a Traysealer. This transportation belt preferably directly feeds the filled trays 14 into a sealing station, where they are closed with a top-film. In the present case, the accumulation belt 9 is designed as a shuttle belt; i.e. its front end 12 can be moved backwards and forwards particularly to an extent which is at least equivalent or larger than the width of the belt from the packaging machine 13. During its fast backward movement, two stacks 7, which are placed above one tray 14, drop downwards.

Subsequently, the belt on which the trays are placed move forward until another tray stands still under the accumulation belt 9. Simultaneously, the front edge of the shuttle belt 9 moves forward again and two new stacks are placed above the belt of the packaging machine 13, which subsequently drops the product stacks 7. Such a shuttle belt is an endless belt.

As can be particularly seen from FIGS. 2a and 2b, the forming apparatus forms five products simultaneously and subsequently drops five products simultaneously on the accumulation belt 9. These products are stacked on the accumulation belt and as soon as a desired number of products 7 per stack has been achieved, these products are transported into their loading position as indicated by arrow 20. From FIGS. 2a and 2b it can be clearly seen that the number of stacks, which are produced simultaneously, is not equivalent to the number of stacks which are loaded into each packaging. While, in the present case, five stacks 7 are built simultaneously only two stacks are filled into one product item. Thus, by means of the accumulation belt 9, the number of stacks built simultaneously is independent from the number of stacks filled into each packaging. As can be particularly seen from FIG. 2b, one packaging 14 can comprise two stacks 7, which have been built sequentially. In FIG. 2b, one stack 7 is left on the accumulation belt, while five new stacks are accumulated on the accumulation belt 9. Thus, the next tray 14, which will be filled with product 7, comprises two stacks, which have been built sequentially. This preferred embodiment of the present invention allows even more production flexibility.

Figure 2A:
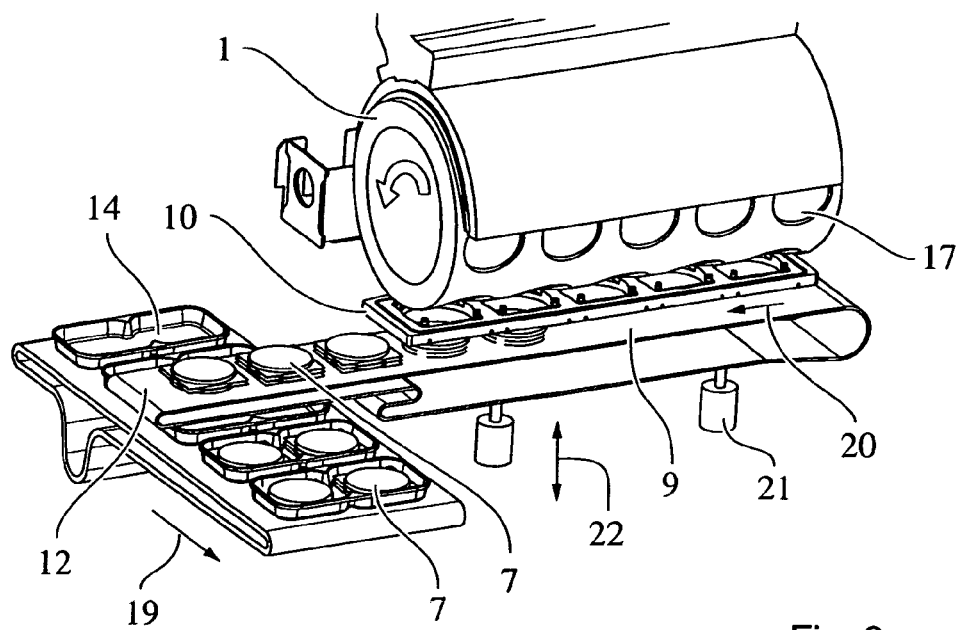
Figure 2B:
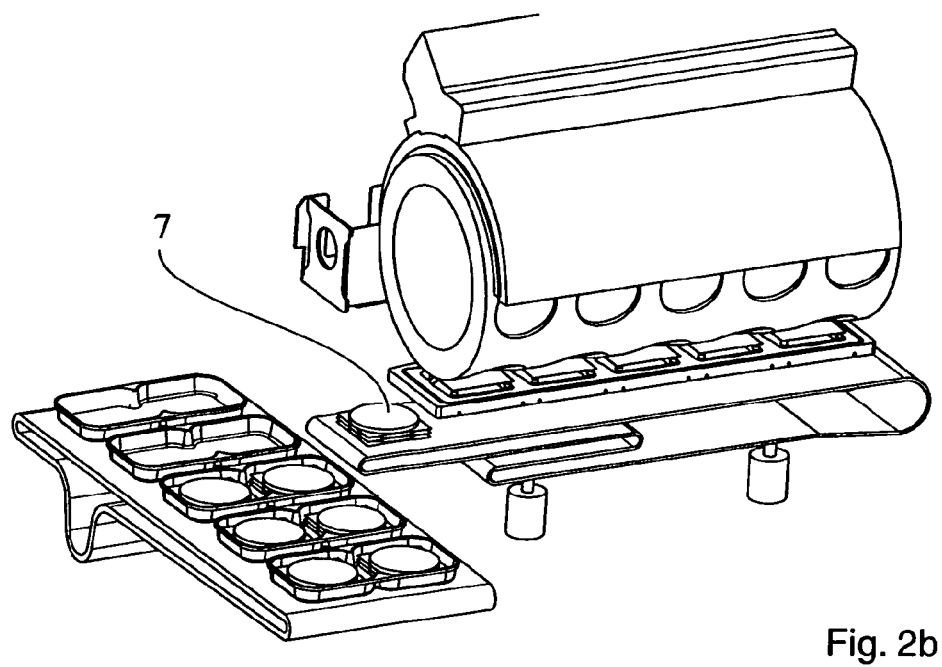

In all examples presented, but particularly as indicated in FIG. 2a, the height of the accumulation belt 9 can be adjusted, for example, while the stacks are built, e. g. the accumulation belt 9 is lowered while the stacks are built to achieve an identical dropping height for all products from the drum and/or to achieve that the height difference between the accumulation belt 9 and the trays is as small as possible during the filling of the product into the trays 14.

Figure 3A:
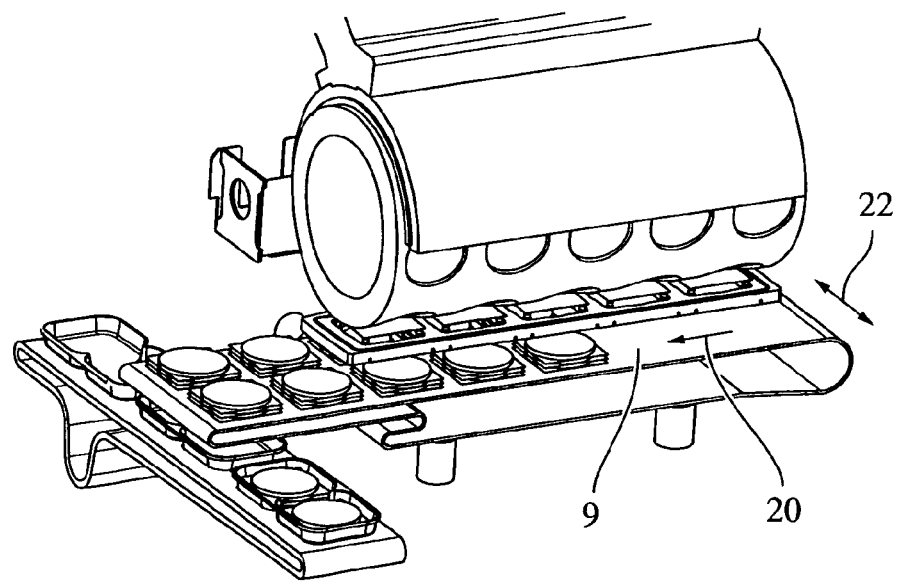
Figure 3B:
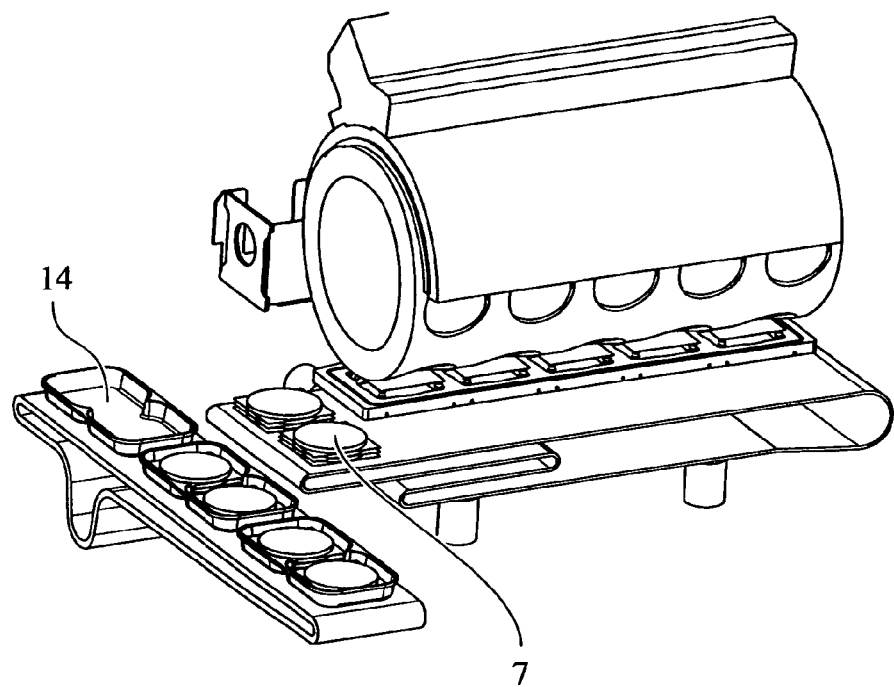

FIGS. 3a and 3b show yet another embodiment of the present invention. In this case, two rows of stacks are accumulated simultaneously on the accumulation belt 9. This is achieved by horizontally altering the relative position between the drum 1 and the accumulation belt 9 as indicated by arrow 22. In the present case, the accumulation belt 9 is shifted horizontally, after one row of five product stacks 7 has been completely arranged. Always two stacks from two different rows are then placed into a packaging.

Figure 4:
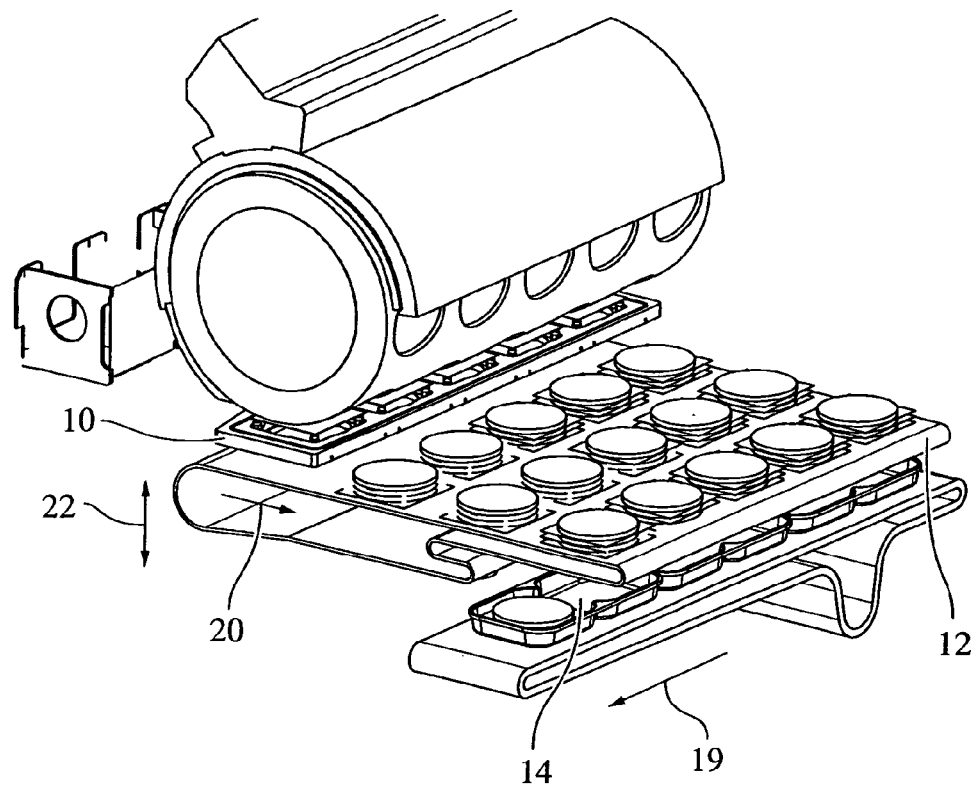
FIGS. 4 and 5 show a second embodiment of the present invention.

FIG. 4 shows yet another embodiment of the present invention. In the present case, the accumulation belt is not shifted perpendicular to its transportation direction as shown in FIGS. 3a and b, but, in order to place a multitude of rows of stacks on the accumulation belt, the extension of the accumulation belt perpendicular to its transportation direction is at least as large as the axial extension of drum 1. Thus, after one row of products 7 has been completed, the belt advances a certain distance, stops and a new row of products can be arranged, which are in parallel of the first row. As soon as one row has reached the front edge 12 of belt 9, this front edge is drawn backwards and the products drop into the trays, which are transported in the transport direction as shown by arrow 19. In the present case, only one row of products is dropped per stroke of the shuttle belt 9.

Figure 5:
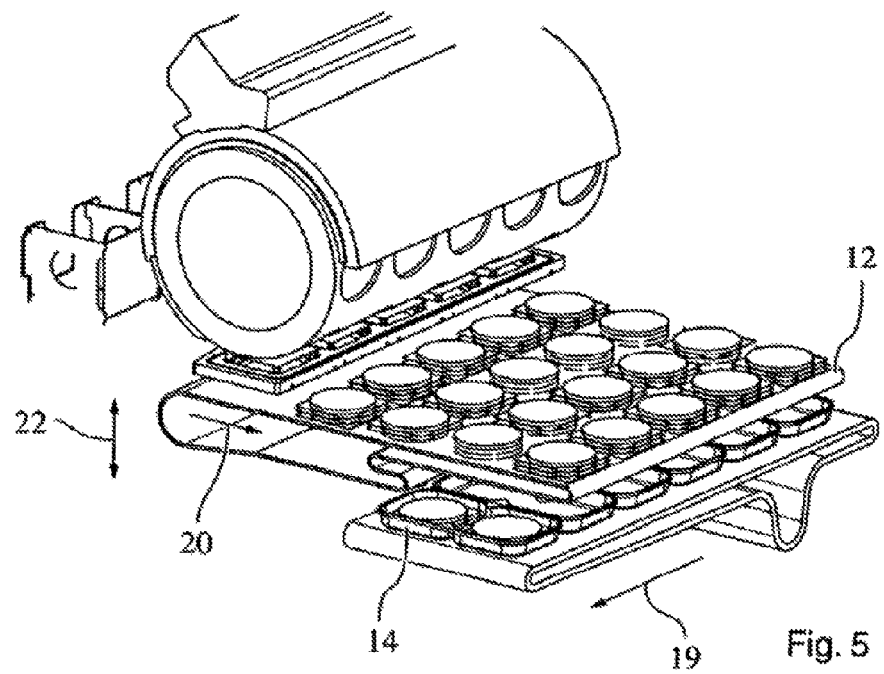
Figure 6:
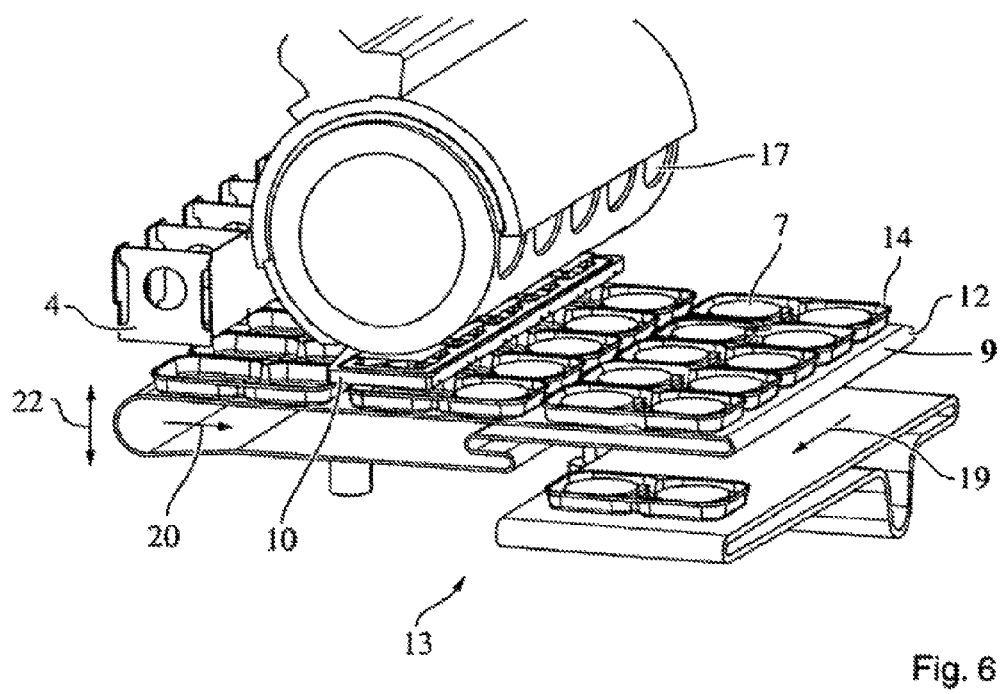
FIGS. 6-9 show yet another embodiment of the present invention.

In the embodiment according to FIG. 5, essentially reference can be made to the disclosure according to FIG. 4. However, in this case two rows of products are filled, here dropped, simultaneously into the trays transported on the lower belt, which can be for example the belt of a packaging machine.

FIGS. 6-9 show yet another embodiment of the present invention. In this embodiment, the products 7 are directly filled into a packaging 14, for example a tray or a box or any other packaging 14, which are loaded on a transportation belt 9, which transports the packagings 14, as indicated by arrow 20. During discharge of the products from the drum, this belt 13 preferably stands still. The products 7 are stacked in the packaging and preferably an interleaver is placed below and/or between two products 7. Regarding the placement of the interleaver, reference is made to the description according to FIG. 1. During stacking, the transportation belt stands still. The person skilled in the art understands that the products can also be shingled. In this case, the belt preferably advances a little, after one row of products has been placed into the trays. In the present case, each packaging tray comprises two stacks 7 of products. The filled trays are subsequently handed over to another transportation belt, which can be, for example part of a packaging machine. As already disclosed, belt 9 can also be altered in its height, as depicted by arrow 22. Additionally, belt 9 can be as shuttle belt, as described above, to simplify the hand-over of the packagings to the next transportation belt. In the present case, the width of the belt on which the packagings are transported, is at least as large as the axial extension of drum 1. The deposited products or the filled trays are removed from the dropping region of the drum by advancing the transportation belt in the direction as indicated by arrow 20, i.e. perpendicular to the axis of rotation of the drum 1. The transportation belt on which the packaging are transported may comprise means to space the packing items at a certain set distance in one or two direction. This simplifies the exact insertion of the products into the packaging. The packaging machine preferably comprises a computer, preferably a PLC, which synchronizes the motion of the transportation means which transport the packagings in one, two and/or three directions, the motion of the drum and or the packaging machine locate downstream from the drum. This applies to all embodiment and examples of the present invention.

Figure 7:
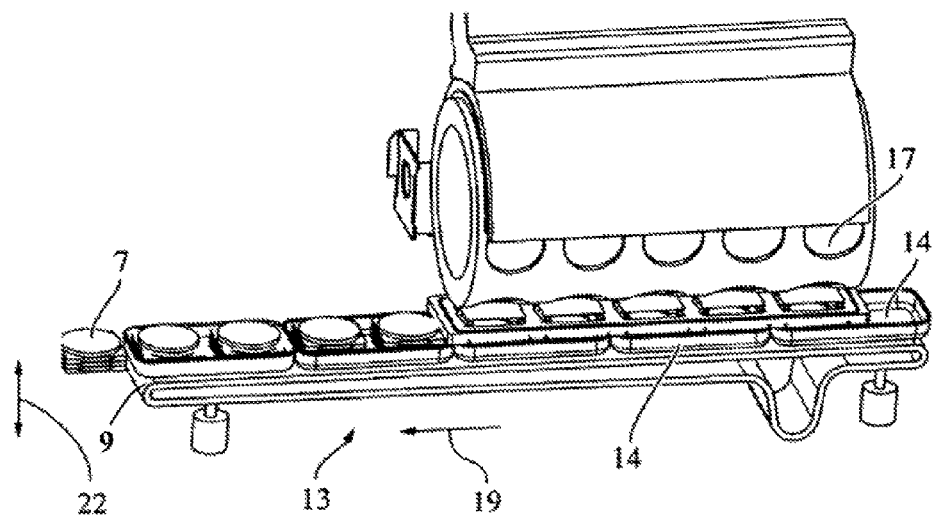

FIG. 7 shows yet another embodiment of the present invention. In this case, the packagings into which the product(s) is/are placed, move(s) parallel to the axis of rotation of the drum. Here, for example, two and a half trays are filled simultaneously, before the belt 9 advances before the next two and a half trays are filled. The packaging can be located in a packaging machine 13, for example a FFS, a tray-sealer etc.

Figure 8:
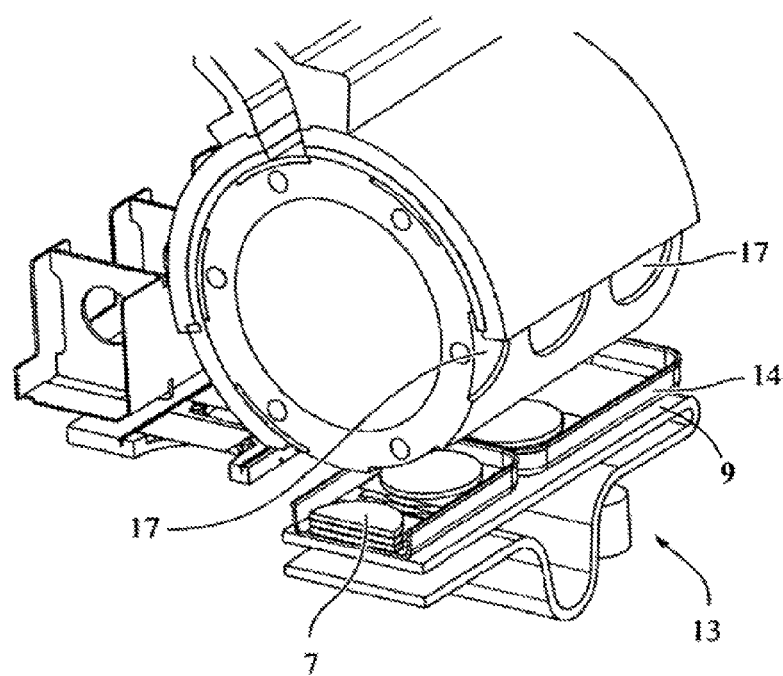

FIG. 8 shows details of the machine according to FIG. 7.

Figure 9:
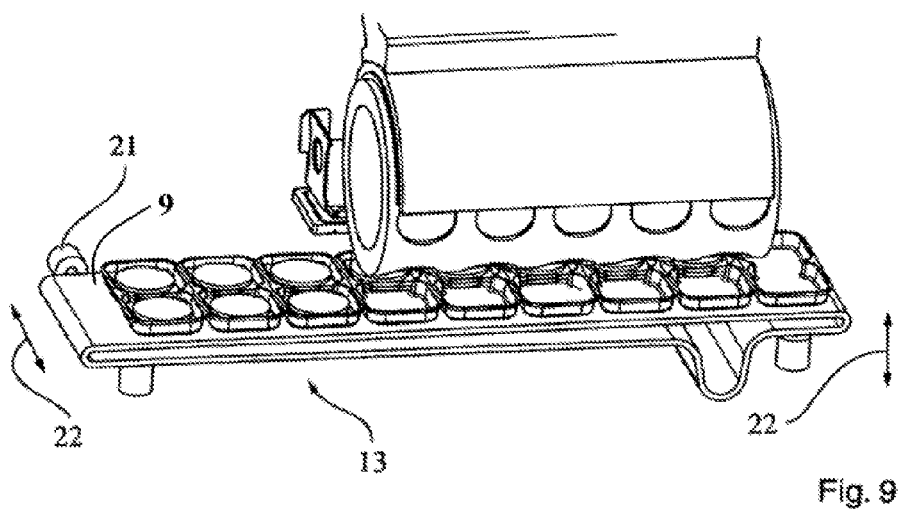

FIG. 9 shows essentially the line according to FIGS. 7 and 8, however, in the present case, the trays 14 are movable horizontally, as indicated by arrow 22, in order to complete the inclusion of two product stacks in each packaging before belt 13 is advanced.

LIST OF REFERENCE SIGNS 1 drum
2 housing
3 shoe
4 interleaver storage
5 food product forming apparatus
6 elongated outlet, holder
7 product, stacked or shingled product, stacked or shingled product in tray
8 -
9 transportation means, accumulation belt
10 interleaver carriage
11 Food production line 12 frontend of belt 9
13 packaging machine, transportation means
14 packaging, tray, box
15 -
16 -
17 cavity
18 interleaver, interleaver paper
19 transport direction of the packaging machine 13 or the transportation means
20 transport direction of the accumulation belt 9
21 shifting means, lifting means
22 shifting direction
23 direction of rotation

The invention claimed is:

1. A food production line with a forming apparatus that comprises:
a rotating drum with a multitude of cavities around its circumference, which is utilized to form a product from a food mass, and
a packaging machine, which packages the product in a packaging,
wherein the cavities are at least partially made from a porous material, through which air is injected to remove the product from the cavities,
wherein the product drops from the cavities directly into the packaging, and
wherein the food production line comprises an interleaver storage and an interleaver carriage to provide an interleaver under and/or between two products.

2. The food production line according to claim 1, wherein the packaging is located on a transportation belt.

3. The food production line according to claim 2, wherein a height of the transportion belt is adjustable.

4. The food production line according to claim 2, wherein a position of the transportion belt is horizontally adjustable relative to the drum.

5. The food production line according to claim 2, wherein the transportation belt stands still when the product drops from the cavities.

6. The food production line according to claim 1, wherein the packaging is located on a transportation belt, and the transportation belt stands still when the product drops from the cavities.

7. The food production line according to claim 1, wherein the packaging is moved on a transportation belt parallel to an axis of rotation of the drum.

8. A food production line with a forming apparatus that comprises:
a rotating drum with a multitude of cavities around its circumference, which is utilized to form a product from a food mass, and
a packaging machine, which packages the product in a packaging,
wherein the cavities are at least partially made from a porous material, through which air is injected to remove the product from the cavities,
wherein the product drops from the cavities directly into the packaging,
wherein at least two products are stacked or shingled in the packaging, and
wherein the food production line comprises an interleaver storage and an interleaver carriage to provide an interleaver under and/or between two products.

9. The food production line according to claim 8, wherein the packaging is located on a transportation belt,
wherein a height of the transportion belt is adjustable, and
wherein a position of the transportion belt is horizontally adjustable relative to the drum.

10. The food production line according to claim 8, wherein the packaging is moved parallel to an axis of rotation of the drum.

11. A food production line with a forming apparatus that comprises:
a rotating drum with a multitude of cavities around its circumference, which is utilized to form a product from a food mass, and
a packaging machine, which packages the product in a packaging,
wherein the cavities are at least partially made from a porous material, through which air is injected to remove the product from the cavities,
wherein the cavities are arranged in parallel in a row,
wherein the product drops from the cavities directly into the packaging, and
wherein the food production line comprises an interleaver storage and an interleaver carriage to provide an interleaver under and/or between two products.

12. The food production line according to claim 11, wherein the packaging is located on a transportation belt,
wherein a height of the transportation belt is adjustable, and
wherein a position of the transportation belt is horizontally adjustable relative to the drum.

13. The food production line according to claim 11, wherein the packaging is moved on a transportation belt parallel to an axis of rotation of the drum.

14. A food production line with a forming apparatus that comprises:
a rotating drum with a multitude of cavities around its circumference, which is utilized to form a product from a food mass, and
a packaging machine, which packages the product in a packaging,
wherein the cavities are at least partially made from a porous material, through which air is injected to remove the product from the cavities,
wherein the cavities are arranged in parallel in a row,
wherein the product drops from the cavities directly into the packaging,
wherein at least two products are stacked or shingled in the packaging,
wherein the food production line comprises an interleaver storage and an interleaver carriage to provide an interleaver under and/or between two products.

15. The food production line according to claim 14, wherein the packaging is located on a transportation belt, and
wherein a height of the transportion belt is adjustable.

16. The food production line according to claim 15, wherein wherein a position of the transportation belt is horizontally adjustable relative to the drum.

17. The food production line according to claim 14, wherein the packaging is moved parallel to an axis of rotation of the drum.

* * * * *